US009942344B2

United States Patent
Lund et al.

(10) Patent No.: US 9,942,344 B2
(45) Date of Patent: Apr. 10, 2018

(54) CONTEXT CONFIGURATION

(71) Applicant: Metaswitch Networks Ltd, Enfield (GB)

(72) Inventors: Christian Lund, London (GB); Mark Overton, London (GB); Murray Rogers, London (GB); John Batty, London (GB)

(73) Assignee: METASWITCH NETWORKS LTD., Enfield (GB)

( * ) Notice: Subject to any disclaimer, the term of this patent is extended or adjusted under 35 U.S.C. 154(b) by 464 days.

(21) Appl. No.: 14/609,300

(22) Filed: Jan. 29, 2015

(65) Prior Publication Data

US 2015/0220482 A1 Aug. 6, 2015
US 2018/0032474 A9 Feb. 1, 2018

(30) Foreign Application Priority Data

Jan. 31, 2014 (GB) .................... 1401692.7

(51) Int. Cl.
*H04L 29/06* (2006.01)
*H04L 29/08* (2006.01)
(Continued)

(52) U.S. Cl.
CPC .......... *H04L 67/2823* (2013.01); *H04L 12/66* (2013.01); *H04L 29/06231* (2013.01); *H04L 12/50* (2013.01); *H04L 67/16* (2013.01)

(58) Field of Classification Search
CPC . H04M 7/006; H04M 7/0024; H04L 12/5695; H04L 47/801; H04L 47/828;
(Continued)

(56) References Cited

U.S. PATENT DOCUMENTS 6,584,108 B1 * 6/2003 Chung ................ H04L 12/5695
370/401
7,929,678 B2 4/2011 Shaffer et al.
(Continued)

FOREIGN PATENT DOCUMENTS

GB 2521192 A * 6/2015 ........... G06F 9/5088

OTHER PUBLICATIONS

"Troubleshooting Unrecognized Voice Interface Cards on Cisco 1750, 1751, and 1760 Routers," Document ID: 5711; Feb. 2, 2006.
(Continued)

*Primary Examiner* — Jae Y Lee
*Assistant Examiner* — Aixa Guadalupe-Cruz
(74) *Attorney, Agent, or Firm* — EIP US LLP

(57) ABSTRACT

Certain examples described herein relate to configuring a call control context in a media gateway. The media gateway has a set of digital signal processors, each having one or more digital signal processor cores. The cores implement digital signal processor channels that are grouped into digital signal processor contexts. When a request to configure a call control context is received, certain examples described herein are configured to assign a set of digital signal processor contexts to process data streams associated with the call control context. In particular, certain examples described herein couple a first digital signal processor context to at least a second digital signal processor context using at least one digital signal processor channel in each of the first and second digital signal processor contexts.

15 Claims, 8 Drawing Sheets

(51) Int. Cl.
  *H04L 12/66* (2006.01)
  *H04L 12/50* (2006.01)

(58) Field of Classification Search
  CPC .............. H04L 47/829; H04L 65/1083; H04L 29/06027; H04L 12/66; H04L 43/0882; H04L 47/122; H04J 3/1682; G06F 9/505; G06F 9/5044
  See application file for complete search history.

(56) References Cited

U.S. PATENT DOCUMENTS

| | | |
|---|---|---|
| 2005/0094650 A1 | 5/2005 | Choi et al. |
| 2005/0135376 A1* | 6/2005 | Bae ..................... H04M 7/1255 370/395.2 |
| 2005/0141520 A1 | 6/2005 | Sim |
| 2005/0213557 A1 | 9/2005 | Hwang et al. |
| 2008/0117898 A1 | 5/2008 | Davidson et al. |
| 2011/0271078 A1 | 11/2011 | Dai et al. |

OTHER PUBLICATIONS

Robert Campbell, "Pro Tools 10 Advanced Music Production Techniques," Cengage Learning PTR; 1 edition; Jun. 6, 2012 (book).

* cited by examiner

CONTEXT CONFIGURATION

CROSS-REFERENCE TO RELATED APPLICATIONS

This application claims priority under 35 U.S.C. § 119(a) to UK Patent Application No. GB 1041692.7, filed on Jan. 31, 2014, which is incorporated by reference in its entirety.

BACKGROUND OF THE INVENTION

Field of the Invention

The present invention relates to configuring a call control context in a media gateway. In particular, but not exclusively, the present invention relates to implementing a call control context by configuring one or more digital signal processors in the media gateway.

Description of the Related Technology

In a communications network, a media gateway is used to couple two or more networks. Typically these networks are different. When coupling networks of different types, a media gateway converts media provided in a first format from a first type of network to a second format required in a second type of network. For example, a media gateway may terminate bearer channels from a switched circuit network (e.g. DSOs) and media streams from a packet network (e.g. real-time transport protocol (RTP) streams in an internet protocol (IP) network). In this way, public-switched telephone networks may be coupled to packet-switched IP networks and vice versa.

The term media gateway is typically used to refer to a combination of hardware and control software; for example, a physical computing device or server executing, in use, one or more sets of computer program code. FIG. 1 shows an example of a media gateway 100. The physical computing device typically comprises one or more digital signal processors (DSPs). In FIG. 1, media gateway 100 is shown with two DSPs 110-A and 110-B. A DSP is a processing component that has an architecture optimized for performing digital signal processing. For example, a DSP may have a specialized instruction set adapted to repeatedly perform a number of mathematical functions on a number of data samples that form part of a signal stream. Each DSP may comprise one or more processing cores. In FIG. 1, the first DSP 110-A is shown as having four DSP cores: 120-A to 120-D. The DSP cores of the second DSP 110-B are omitted for clarity. The term "core" is used to refer to a central processing unit (CPU) that is able to read and execute computer program code. This code may be retrieved from random access or read only memory. Each DSP core may comprise a specialized CPU that is optimized for encoding and/or decoding operations involved in processing a data stream. A media gateway may have a plurality of DSPs, wherein each DSP has a plurality of cores. Each DSP core has a number of resources. These resources may comprise, for example, one or more of: processing resources associated with a number of instructions that can be processed by a central processing unit; memory and/or cache for storing data and/or instructions; and conference resources associated with a conference call.

A media gateway processes one or more communication channels. These may comprise logical channels that carry data associated with communications between two or more parties. In the context of one or more DSPs that constitute a media gateway, the term "DSP channel" may be used to refer to allotted data processing resources that are used by a DSP core to process or handle data carried in a communications channel, e.g. a DSP core implements a DSP channel that processes a data stream by way of computer program code and/or memory. For example, a DSP channel may comprise a programming abstraction that is used to divide data processing on a DSP core; a DSP channel may comprise a thread-like object that allows data processing for data associated with a particular communication channel to be assigned to the central processing unit of the DSP core for a particular time period, while ensuring real-time or near-real-time processing. The data stream may comprise a media stream or control data. For example, a DSP channel may process an RTP/Nb stream or a DSO stream, handle High-Level Data Link Control (HDLC) signaling or play media from an announcement file into a media stream. In practice a media gateway may be capable of processing audio, video and T.120 protocol data alone or in any combination. It may also be capable of full duplex media translations as well as playing audio and/or video messages. It is also capable of performing other interactive voice response (IVR) functions and may perform media conferencing.

DSP channels exist within a DSP context. When a DSP channel is needed for data or media processing, a DSP context is established. A "DSP context" is a term used herein to refer to collection of one or more DSP channels. Within a DSP context, these DSP channels are related; they may only share data with other DSP channels in the DSP context. In other words, a DSP channel within a DSP context is not able to natively exchange data with DSP channels in other DSP contexts. In use, a DSP context is established in relation to a DSP core. The DSP core is then responsible for processing any DSP channels within that DSP context, for example until a call ends. In FIG. 1, two DSP contexts 125-A and 125-B are schematically shown. These DSP contexts 125 are implemented on a first DSP core 120-A. The DSP contexts assigned to the other DSP cores are not shown in FIG. 1 for clarity. A DSP core may have a plurality of DSP contexts, each DSP context defining a plurality of DSP channels.

In a media gateway there are limitations to the size of a call that can be processed. For example, a DSP context is limited to a DSP core and the DSP core sets an upper bound on the processing that can be performed by the media gateway. While adequate for certain current telecommunications processes, these hardware limitations constrain the use of the telecommunications network, e.g. certain call configurations are not possible without upgrading the processing capacity of the media gateway.

SUMMARY

According to a first embodiment of the present invention, there is provided a media gateway comprising one or more digital signal processors, the one or more digital signal processors comprising one or more digital signal processor cores, a digital signal processor core in the one or more digital signal processor cores implementing a plurality of digital signal processor channels, wherein the plurality of digital signal processor channels are grouped into one or more digital signal processor contexts, each digital signal processor context defining a group of communicatively-couplable digital signal processor channels that are able to exchange data by way of the digital signal processor core; an interface to receive a request to configure a call control context for a call, the call control context comprising a plurality of terminations, each termination comprising an end point for a data stream associated with the call; and a controller arranged to configure a plurality of digital signal processor contexts for the call control context, wherein the controller is arranged to configure a set of digital signal processor channels in the plurality of digital signal processor contexts to process the set of data streams corresponding to the plurality of terminations, and wherein the controller is arranged to communicatively couple a first digital signal processor context in the plurality of digital signal processor contexts to at least a second digital signal processor context in the plurality of digital signal processor contexts using at least one digital signal processor channel in each of the first and second digital signal processor contexts.

According to a second embodiment of the present invention, there is provided a method comprising receiving, at a media gateway, a request to configure a call control context for a call, the media gateway comprising one or more digital signal processors, the one or more digital signal processors comprising one or more digital signal processor cores, a digital signal processor core in the one or more digital signal processor cores implementing a plurality of digital signal processor channels, wherein the plurality of digital signal processor channels are grouped into one or more digital signal processor contexts, each digital signal processor context defining a group of communicatively-couplable digital signal processor channels that are able to exchange data by way of the digital signal processor core, the call control context comprising a plurality of terminations, each termination comprising an end point for a data stream associated with the call; and configuring, at a media gateway, a plurality of digital signal processor contexts for the call control context, wherein a set of digital signal processor channels in the plurality of digital signal processor contexts are configured to process the set of data streams corresponding to the plurality of terminations, wherein at least a first digital signal processor context in the plurality of digital signal processor contexts is communicatively coupled to at least a second digital signal processor context in the plurality of digital signal processor contexts using at least one digital signal processor channel in each of the first and second digital signal processor contexts.

Further features and advantages of the invention will become apparent from the following description of certain examples, which is made with reference to the accompanying drawings.

DETAILED DESCRIPTION OF CERTAIN INVENTIVE EMBODIMENTS

Example of a Telecommunications Network

Before certain examples are described, the use of a media gateway in a telecommunications network will be discussed, together with an example control framework.

Figure 2:
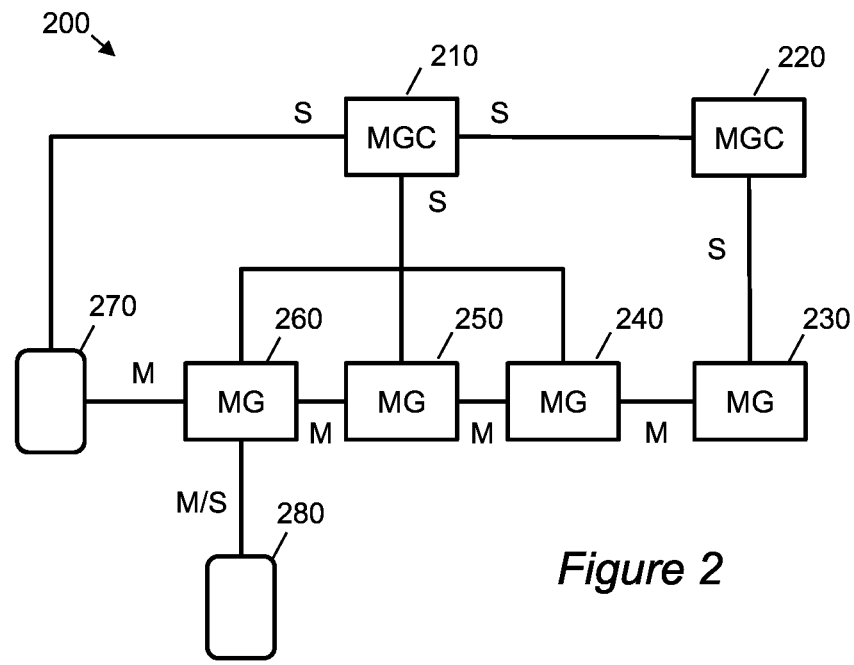
FIG. 2 is a schematic diagram showing use of a plurality of media gateways in a telecommunications network according to one or more embodiments of the present invention.

FIG. 2 shows how a media gateway may be used within a telecommunications network 200. The telecommunications network 200 of FIG. 2 comprises a first media gateway controller 210 and a second media gateway controller 220, as well as a plurality of media gateways. The plurality of media gateways comprise: a first media gateway 230, a second media gateway 240, a third media gateway 250 and a fourth media gateway 260. The fourth media gateway 260 is communicatively-coupled to a first user equipment 270 and a second user equipment 280. The user equipment may comprise, amongst others, one or more of: a telephone handset, mobile phone, smart phone and a computer terminal. In this example, the first media gateway controller 210 is communicatively coupled to each of the second media gateway 240, the third media gateway 250, the fourth media gateway 260 and the first user equipment 270. In FIG. 2, the first media gateway controller 210 communicates with each of these devices to provide signaling information, e.g. sends and/or receives control commands for the telecommunications network. The second media gateway controller 220 is communicatively coupled to the first media gateway controller 210 and the first media gateway 240. The second media gateway controller 220 exchanges signaling ("S") information with the first media gateway controller 210 and the first media gateway 240. The first to fourth media gateways 230 to 260 are communicatively coupled in series and exchange media ("M") information. The fourth media gateway 260 is then communicatively coupled to the first and second user equipment 270, 280 and exchanges media information with these devices. In FIG. 2, the fourth media gateway 260 also exchanges signaling information with the second user equipment 280. In this example, all telephone media that cannot flow directly between the telephone endpoints, e.g. user equipment 270, 280, does so via one or more media gateways.

FIG. 2 should be understood as a simplified model presented for ease of explaining the context of certain examples. Actual implemented networks may contain additional devices, such as session border controllers, and/or comprise more complex topologies.

In a telecommunications network, such as that shown in FIG. 2, a media gateway controller controls portions of a call state that pertain to connection control for media channels in a media gateway. A media gateway controller controls one or more media gateways via a signaling interface. This signaling interface may be referred to as a call control application programming interface (API). One example call control API is defined by the H.248 standard, as recommended by the International Telecommunication Union Telecommunication Standardization Sector (ITU-T). Commands exchanged according to the call control API may comprise at least a portion of the signaling information exchanged in FIG. 2. Each media gateway is considered to be "dumb", in that it either acts according to instructions provided via the call control API or sends one or more error responses if it is not able to act. The manner in which each media gateway implements the instructions received via the call control API is opaque to the media gateway controller.

Call Control API

As described above, a call control API enables a media gateway controller to instruct a media gateway, e.g. to instruct certain media connectivity to program. In an example call control API there are at least two sets of entities: terminations and contexts. To distinguish from digital signal processor contexts as described above, the latter are referred to herein as "call control contexts"; "call control contexts" are defined as entities with a call control API and DSP contexts comprise a group of associated DSP channels that are able to exchange data, e.g. natively, within a DSP core. A termination sources and/or sinks one or more data streams. A data stream may comprise a media and/or control stream. As used herein a "data stream" may comprise one or more of a media stream for a packet-based protocol and a bearer channel for a switched circuit network. In a multimedia conference, a termination can be multimedia, e.g. source and/or sink multiple media streams. Media stream parameters, as well as bearer parameters e.g. for a bearer channel, are encapsulated within the termination. A call control context then comprises an association between a collection of terminations. This terminology is used, for example, in H.248. An example of a call control context is shown in FIG. 3.

Figure 3:
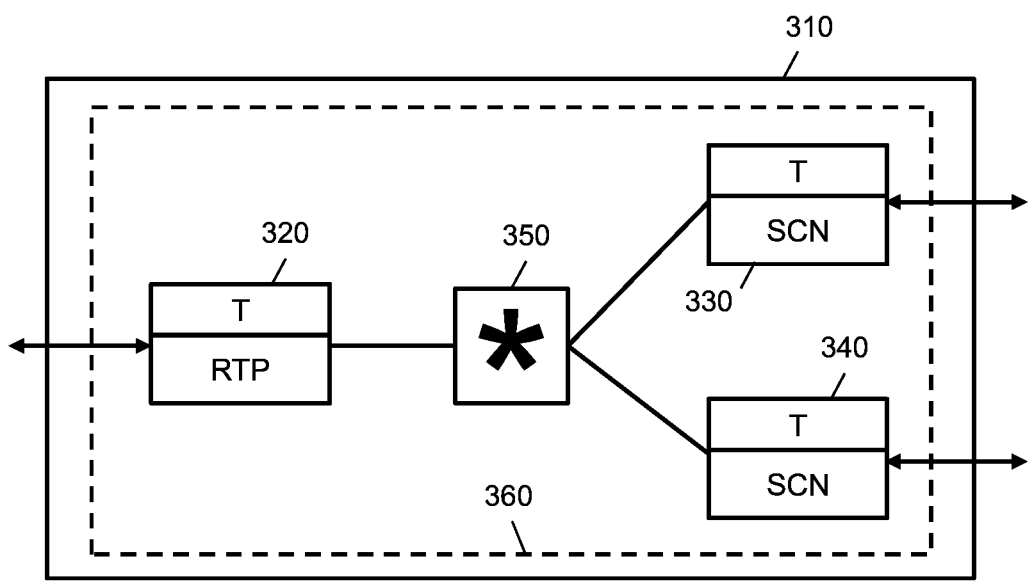
FIG. 3 is a schematic diagram showing a first representation of a call control context according to one or more embodiments of the present invention.

FIG. 3 shows a schematic media gateway 310. This media gateway 310 manages three terminations 320, 330 and 340: a first termination 320 sinks and sources a real-time protocol (RTP) stream; and each of a second termination 330 and a third termination 340 sinks and sources a switched circuit network stream (SCN—i.e. from a telephone network). These streams may, for example, relate to a telephone conference between three parties. The streams are communicatively coupled by the media gateway 310, as illustrated by component 350. This enables the three parties to converse with each other, even though they use different media. The collection of three terminations in FIG. 3 gives rise to a call control context 360, which is managed by the media gateway 310.

In its implementation of the functions of the call control API, a media gateway needs to map the call control entities to corresponding DSP entities. In a comparative example, a call is programmed over a call control API by mapping each termination to a corresponding DSP channel and by mapping a call control context to a corresponding DSP context. Indeed, many call control frameworks were designed to explicitly or implicitly reflect this mapping. This, however, constrains the size of each call control context.

A DSP core can only process a set number of DSP channels, e.g. due to resource limitations such as processor cycles, available cache and/or available memory. Each DSP core may have a different maximum number of channels they can send, receive and process data on. Typically, this limit is set by firmware for the DSP core. Here the term "firmware" is used to refer to, for example, low-level control program code and/or data stored in memory such as read-only memory (ROM) and/or flash memory. In the latter case, when at least a computing unit making up the media gateway and coupled to and/or comprising one or more DSPs boots, an embedded processor may access a firmware image from the flash memory and download this image to one or more DSPs. As such, different firmware versions for a DSP or DSP core may have different DSP channel limits. For example, different firmware versions may enable and/or disable certain DSP features that may accordingly alter the processing and/or memory overhead per DSP channel, resulting in greater or fewer DSP channels per DSP core. Similarly, different firmware configurations may also influence the number of DSP channels per DSP core; one DSP core may allow 63 DSP channels with one configuration and 56 DSP channels with another configuration. Again, different firmware configurations may alter the processing and/or memory characteristics of a DSP core, in turn altering possible DSP channel limits.

As well as a maximum number of DSP channels per DSP core, the firmware of a DSP or DSP core may set limits for the communication of data between DSP channels being implemented by the DSP core. For example, in order to efficiently allocate a finite amount of memory available to the DSP core, each DSP channel may only be able to exchange data with a set number of other DSP channels. A group of communicatively-couplable DSP channels that are able to exchange data by way of the DSP core may form the basis of a DSP context. In this case, a DSP channel being implemented by a DSP core and forming part of a first DSP context is not able to natively, i.e. within DSP core CPU processing, share data with a DSP channel forming part of a second DSP context, either on the same or on a different DSP core. For example, firmware may configure a fixed array for each DSP channel in memory; this fixed array may have a number of entries equal to the number of DSP channels it can be communicatively-coupled with. In this case, the size of the fixed array, i.e. the number of entries in the fixed array, sets the size of the DSP context, i.e. the number of DSP channels in each DSP context. The size of the fixed array may be different for different DSP channels, leading to a plurality of DSP contexts on one DSP core, each having a different number of DSP channels. For example, a DSP core may implement 63 DSP channels; these DSP channels may then be grouped into 12 DSP contexts limited to 5 DSP channels and 1 DSP context limited to 3 DSP channels. A DSP context may have its own constraint on the number of contained DSP channels and this constraint may be independent of a per-DSP-core cap. As these firmware limits are constrained by physical limits, such as the quantity of memory and/or processing cycles available, they cannot be altered without impairing the functionality of the DSP core.

As described above, media can only be passed directly (i.e. natively to the DSP) from one DSP channel to another if they are within the same DSP context. As there is a maximum number of DSP channels that can be accommodated in a DSP context, this means that there is a maximum number of terminations that can be managed as part of any one call control context. Due to the reasons set out above, the maximum number of terminations that can be managed as part of any one call control context may vary from one or more of DSP context to DSP context and DSP core to DSP core and may also depend on the current loading of a media gateway. This leads to a hard limitation, if a DSP context can have no more than n DSP channels, then a call as programmed over a call control API can have no more than n call parties.

In a comparative example, a media gateway may advertise its capabilities using the call control API. This may occur on startup or at the beginning of a predetermined time period (e.g. at start of day). This advertisement may include the maximum number of terminations within a call control context as discussed above. These constraints are communicated to the media gateway controllers where they need to be incorporated in the call control programming at each media gateway controller. This restricts the behavior of each media gateway controller. In other cases, a media gateway may not advertise its limitations on terminations, but may not be able to accept call control API requests to configure a call control context with a particular number of termination, e.g. a number of terminations that exceeds a limit on a maximum number of DSP channels for a DSP context.

Based on these limitations it is desirable for a media gateway to be as unrestrictive as possible. If the restrictions applied by a media gateway can be minimized, this then frees a media gateway controller to apply call control programming without constraint. Furthermore, it is also desirable to minimize limitations on calls for users of a telecommunications network; for example, it would be advantageous to allow arbitrarily large numbers of users to connect to a teleconference and/or access a wide variety of multimedia services.

Certain examples described herein enable DSP firmware constraints to be overcome. This is achieved by configuring a plurality of digital signal processor contexts to operate together in a common configuration. In effect this decouples media gateway limitations from DSP hardware limitations. Certain examples described herein enable a media gateway to program a configuration on DSP contexts, e.g. by creating DSP channels and linking them together. In particular, certain examples herein allow a media gateway to create multiple groups of linked DSP channels, together with the required links between the groups. These examples are implemented in control programming without effecting the hard limits set by DSP firmware.

Certain examples described herein overcome these limitations while still meeting requirements for an apparently "dumb" media gateway. For example, the hardware limitations are minimized while retaining the ability for each media gateway to simply do what it is programmed to do over a call control API. These examples do this in a manner that is opaque to a media gateway controller. For example, call control programming may be used by the media gateway controller without any imposed constraint and a call can be handled in manner that follows the programming standard without compromise. Certain examples described herein are able to do this by provisioning a configuration directly on a media gateway, e.g. within the boundary of the media gateway in a manner that is opaque to outside instructing entities.

Moreover, certain examples described herein allow calls of a size and/or type that would breach the hardware constraints if implemented according to the above-described comparative example. This is achieved with the same DSP entities as previously described, i.e. DSP channels within DSP contexts. However, in the present examples multiple DSP contexts are conditionally introduced for a single call control context. As media cannot natively flow from one DSP context to another, "context couplings" are introduced to build the correct overall endpoint connectivity within the hardware.

Example Context Configuration

An example of a call control context configured using multiple DSP contexts will now be described with reference to FIGS. 4 and 5

Figure 4:
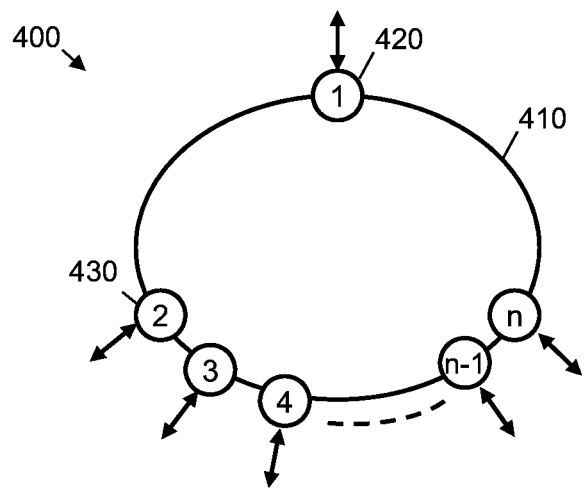
FIG. 4 is a schematic diagram showing a second representation of a call control context according to one or more embodiments of the present invention.

FIG. 4 is a schematic diagram 400 that represents a call control context 410 according to an example. In this call control context 410 it is desired to have n terminations 420, 430; these are labelled 1 to n in the Figure. In a comparative case, where a DSP context is limited to 6 DSP channels, then $n<=6$, e.g. only six parties or terminations can be involved in a call. In another case, a hardware limit may be imposed on the number of DSP channels that can receive media from a single other DSP channel. For example, in FIG. 4 it may be desired for terminations 2 to n to receive media from termination 1. In this case, it may only be possible for five DSP channels to receive media from a particular other DSP channel, e.g. as before $n<=6$. It is to be understood that the DSP limitations discussed above may be defined in a number of different ways.

If a media gateway is limited such that it is only possible for five DSP channels to receive media from a particular other DSP channel, then, in a comparative case, a request to add a sixth listener termination to a call control context with five existing listener terminations will be refused. For example, if a media gateway controller programs a sixth termination to receive media from the same source termination that five other terminations are receiving from (e.g. add a seventh termination to the set), then in this comparative case, the media gateway cannot honor the request, and is forced to reject it. In comparison, FIG. 5 shows an example where the programming request can be accepted.

Figure 5:
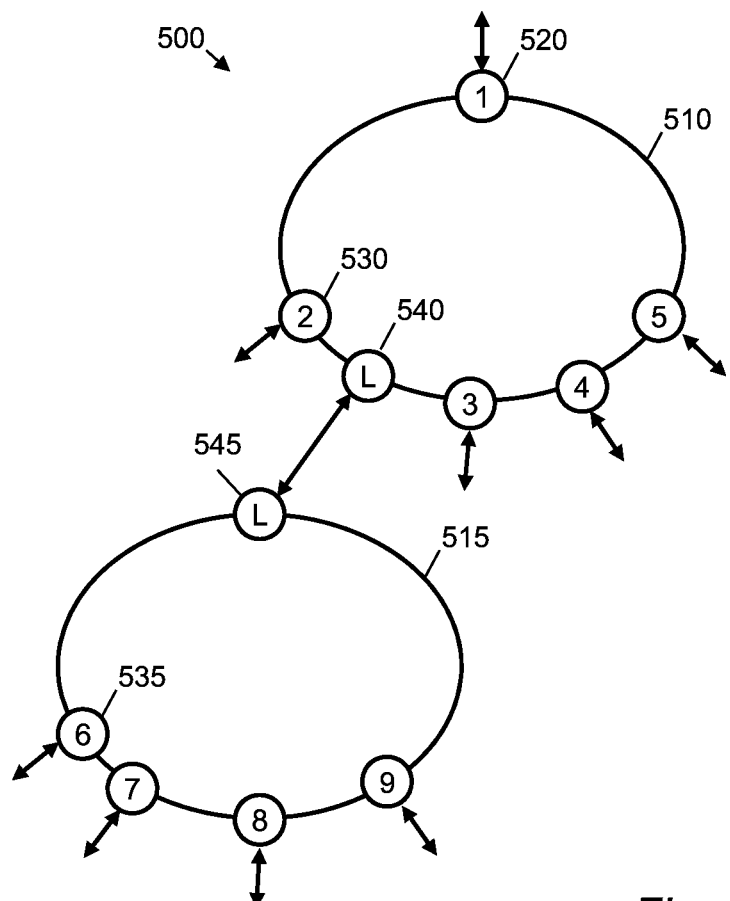
FIGS. 5 and 6 are schematic diagrams showing one or more configurations for digital signal processor contexts according to one or more embodiments of the present invention.

FIG. 5 shows a DSP context configuration 500 that can be used to manage a call control context when n is greater than a limiting factor of the DSP context. For example, if there is a limitation that $n<=6$ as described above, the configuration of FIG. 5 may be used to manage a call control context where $n>6$. With reference to the latter example above, the configuration of FIG. 5 would allow more than five listener terminations to be programmed for a given call control context, e.g. allow a call with more than six participants.

FIG. 5 shows a first DSP context 510 and a second DSP context 515. Consistent with the examples described above, in this example each DSP context is limited to six DSP channels. Each DSP channel in FIG. 5 is represented by a node 530, 535. Each DSP channel is mapped to a termination 430 in the call control context 410 as described previously. However, in this case one DSP channel 540, 545 in each DSP context 510, 515 is used to link the two DSP contexts, such that in combination they can provide the processing to implement the call control context. By using this link, data may flow between DSP contexts and the configuration may be treated as one logical unit, even though each individual DSP context in the configuration may be implemented on a different DSP core. In other words, traffic is passed outside of a DSP core using one DSP channel and then passed back into the same or another DSP core using another DSP channel.

For example, the configuration of FIG. 5 may be used to implement a call control context with eight listener terminations. This violates the previous "hard" limit of five listener terminations. In this case, a first DSP channel 520 in the first DSP context 510 is used to source a media stream. This media stream is then communicated to each of DSP channels 2, 3, 4 and 5 within the first DSP context 510. Hence, the first DSP context 510 uses four DSP channels to implement four listener terminations.

To implement the remaining four listener terminations, a first DSP channel 540 is programmed as a first "link channel" within the first DSP context 510. This first link channel 540 is arranged to forward the media stream to a second DSP channel 545—a second "link channel"—in the second DSP context 515. The second link channel 545 is then used to publish the media stream to each of four DSP channels 6, 7, 8 and 9 in the second DSP context 515. These four DSP channels 6, 7, 8 and 9 receive the media stream and process it for each of the four remaining listener terminations. In this case no individual DSP context violates a rule of no more than five DSP channels receiving from a source channel. In effect, the arrangement of FIG. 5 "cascades" DSP contexts to generate a "DSP context tree".

Figure 6:
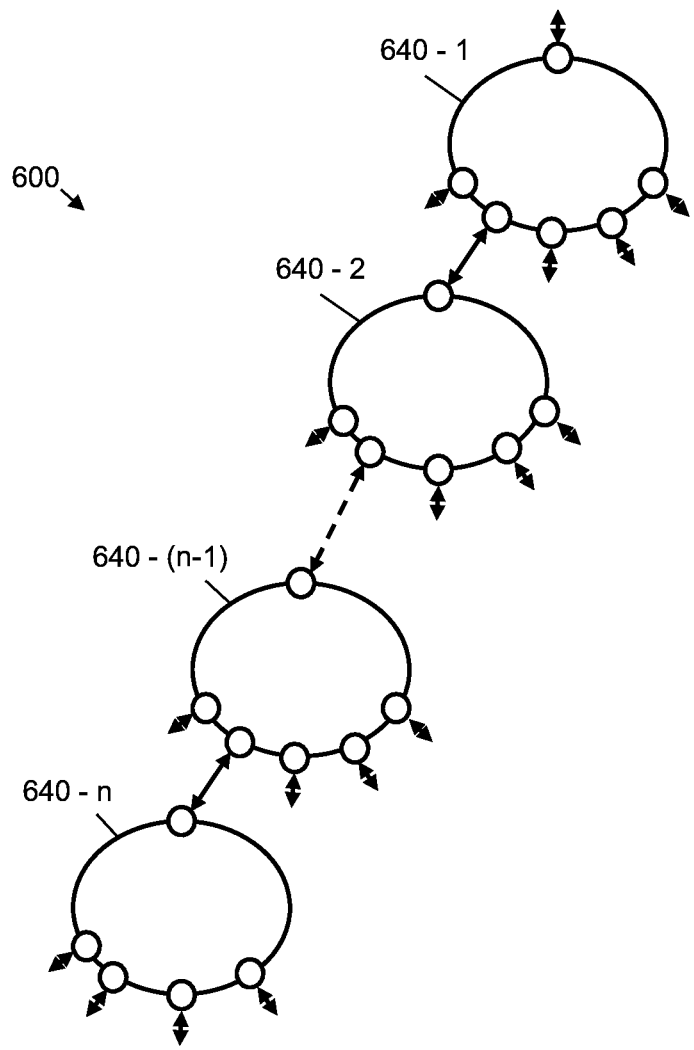
Figure 7:
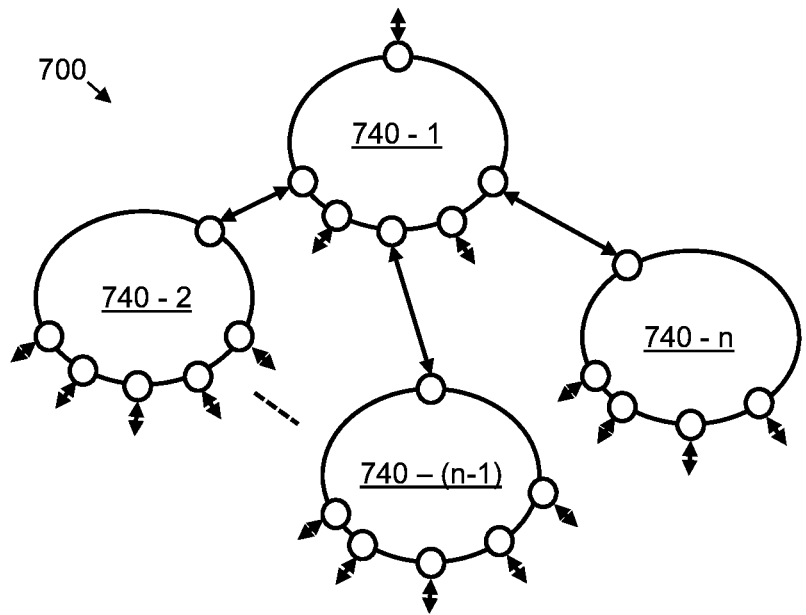
FIG. 7 is a schematic diagram showing another configuration for digital signal processor contexts according to one or more embodiments of the present invention.

FIG. 6 shows an expanded example 600 showing how a plurality of DSP contexts 640 may be coupled in series to implement a call control context with an arbitrary number of terminations. In each case, one or more DSP channels in each DSP context may be used to link the DSP context to another DSP context. In the example of FIG. 6, each DSP context may link to up to six other DSP contexts, this limit being set by the maximum allowed number of DSP channels per DSP context. Of course, in the present case, "six" is simply an example and actual DSP contexts may allow more or fewer DSP channels. FIG. 7 shows an alternate expanded example 700 showing how a plurality of DSP contexts 740 may be coupled in parallel to implement a call control context with an arbitrary number of terminations. Actual implementations may select a topology that combines one or more DSP contexts arranged in series and one or more DSP contexts arranged in parallel, e.g. the DSP content 740-1 could implement DSP context 640-($n$−1) in FIG. 6. In more advanced examples, more complex topologies may also be possible.

Example of Implementing a DSP Context Configuration

Figure 8:
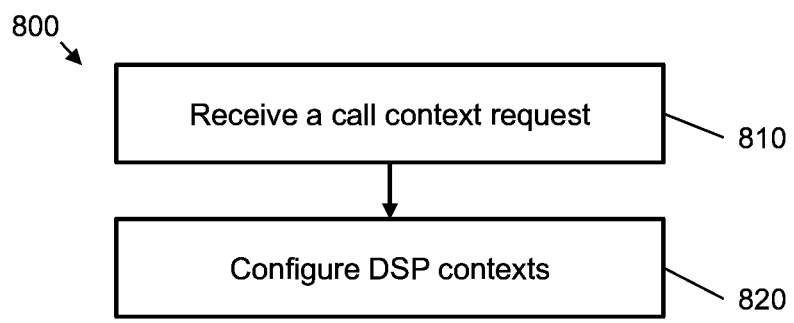
FIG. 8 is a flow chart showing a method of configuring a call control context according to one or more embodiments of the present invention.

FIG. 8 shows an example framework method 800 for implementing a DSP context configuration. At block 810 a request is received to configure a call control context. This request may be one or more of: a request to create a new configuration for a new call control context; and a request to modify a configuration associated with an existing call control context. With relation to a media gateway, the request may arise externally or internally. For example, a request to create a new call control context, or to add another termination to an existing call control context may be received from a media gateway controller using the call control API. Alternatively, a condition within the media gateway may be met that requires the configuration of DSP contexts. In both cases the request may be seen as a "trigger event".

At block 820, in response to the request at block 810, a number of DSP contexts are configured to implement a call control context. In cases where it is not possible to configure DSP contexts in response to the request, block 820 may alternatively comprise responding with an error message. In one case, as described with reference to FIGS. 4 to 7 above, block 820 may comprise linking a plurality of DSP contexts to provide a configuration to implement the request call control context.

Examples of Considerations for Linking DSP Contexts

In the examples of FIGS. 4 to 7 above, linking one DSP context to another consumes DSP resources; in the illustrated examples these resources comprise two DSP channels, one for each DSP context that is linked. As described above, DSP resources are limited; hence, in certain cases, the linking of DSP contexts and the mechanism for that linking needs to be carefully considered. Linking should be performed efficiently—in some cases it may need to be used sparingly. For example, there may be a trade-off between "cascading early", e.g. linking DSP contexts before DSP limitations are reached, and "cascading late", e.g. linking DSP contexts when linking becomes necessary to avoid refusing a request. A programmed strategy of "cascading early" may use more DSP resources than are strictly necessary yet a programmed strategy of "cascading late" may result in detectable glitches in managed media streams if DSP contexts and DSP channels are shuffled after having been configured. In certain cases, determining whether to "cascade early" or "cascade late" may be decided dynamically by the media gateway. This may enable an optimum trade-off for a particular set of operating conditions.

In one case, DSP contexts are configured by a media gateway following a trigger event that is associated with a resource limitation of the media gateway. For example, the trigger event may be initiated in the case of one or more of: reaching a predetermined number of DSP channels, in use, on a given DSP core; reaching a predetermined number of DSP channels, in use, in a given DSP context; reaching a predetermined number of DSP channels, in use, that can receive media from a single other DSP channel; reaching a predetermined number of DSP channels, in use, that a single DSP channel can send media to; reaching a predetermined number of data streams, in use, that can be mixed in a given single DSP context; and reaching a predetermined quantity of conferencing resources that are used within a given DSP core. These criteria may be applied for each of a plurality of DSP contexts and/or DSP cores. In one case the predetermined number may be a maximum number, e.g. a limitation set by the DSP hardware. In another case the predetermined number may be a statically or dynamically configured value. For example, if a DSP firmware were to support up to ten DSP channels per DSP context, but the DSP core handling the DSP context only had space for five DSP channels given current resource usage levels, then cascading at a point when five DSP channels were required may be necessary even though the theoretical hardware limit has not been reached. In this case, a trigger event for configuring DSP contexts is a temporary or short-term resource shortfall. In other examples, a value may be determined based on empirical and/or theoretical calculations, e.g. one trigger condition may be set based on current resource usage metric or a value one or two below the maximum may present an optimum trade-off between cascading early and cascading late. The set of trigger events set out here are thus not to be seen as limiting, and the set of conditions may be widened and/or combined over time.

Figure 9:
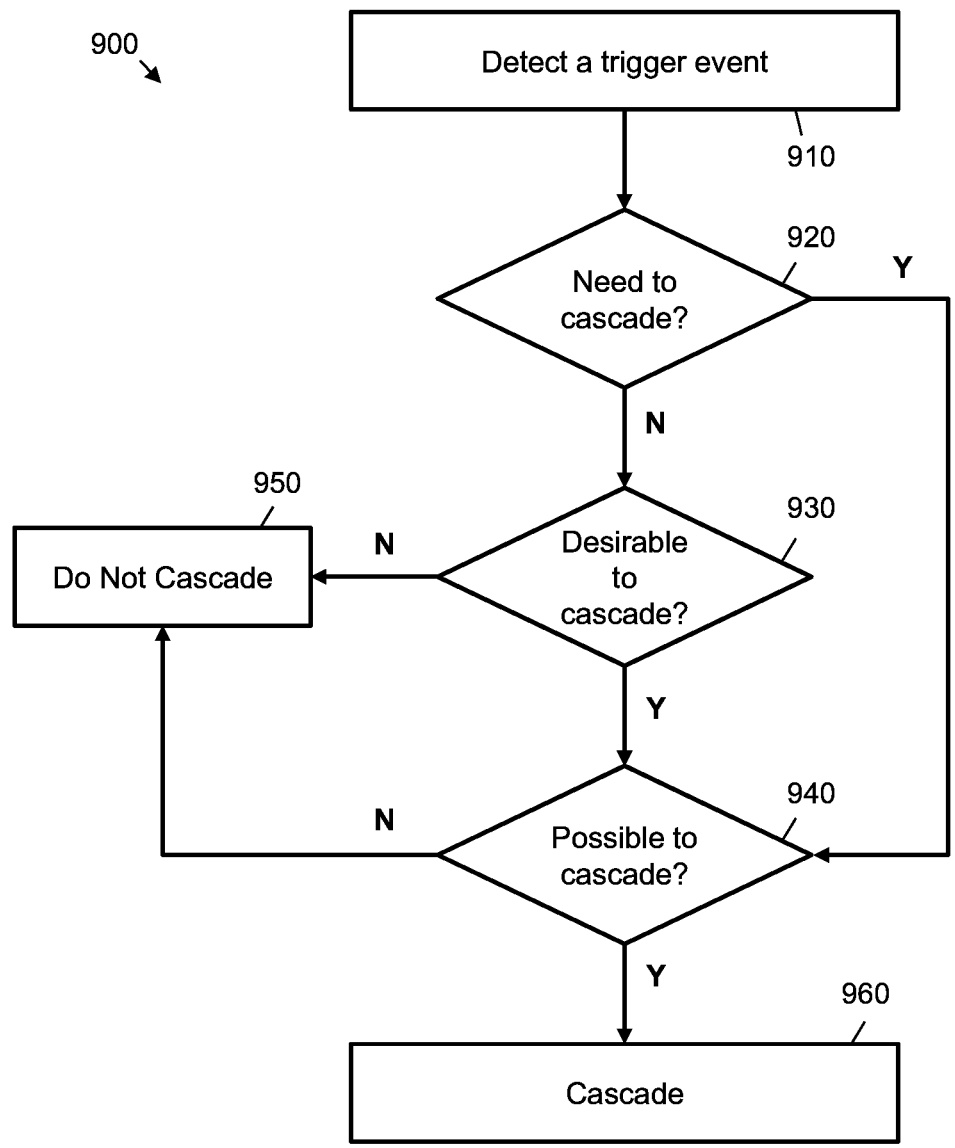
FIG. 9 is a flow chart showing determinations that may be made when configuring a call control context according to one or more embodiments of the present invention.

FIG. 9 is a flow chart showing a method 900 that may be initiated on a media gateway when a request or other trigger event is received. The method 900 may be implemented by a controller within the media gateway. The method 900 demonstrates how linking DSP contexts—cascading—may be conditional.

At block 910, a trigger event is detected. This may be a request to configure a new or existing call control context that is received from a media gateway controller, or a trigger event as described above. At block 920, the controller evaluates a first set of one or more criteria to determine if cascading is needed. If cascading is not needed, then the method may proceed to block 930 to determine if cascading is desired. If it is determined that cascading is necessary, for example due to one or more of the first set of criteria being met, then the method proceeds to block 940. At block 940, a check is made to see whether cascading is possible. For example, a check may be made to see whether cascading can be achieved while honoring the call control programming. If there is an indication in the affirmative, then cascading is programmed at block 960. If there is an indication in the negative, then cascading is not programmed at block 950, e.g. a request may be denied with an error message. If cascading was not needed at block 920, a check is made to see whether cascading is desirable at block 930. This may comprise the controller evaluating a second set of one or more criteria. These criteria may comprise determining whether to cascade early, for example based on the options discussed in more detail in the "Desirable to Cascade?" section below. If cascading is not desirable, then at block 950 cascading is not performed. If, based on the evaluation of the second set of one or more criteria, cascading is desirable, the method proceeds to block 940.

The method of FIG. 9 is provided as an example to illustrate the decision making that may be performed by a controller of a media gateway to decide whether to link DSP contexts. The various blocks therein are for illustration only; the various determinations may be performed in an alternative order in other examples and/or may be complemented with other examinations. Alternatively, one or more of the determinations of FIG. 9 may be performed separately to determine if cascading is to be performed. In any case, an aim of this decision making is to decide one or more of whether multiple DSP contexts are needed, whether multiple DSP contexts are desired and whether using them would yield a correct overall media connectivity. Further examples of each of these determinations are described below.

Need to Cascade?

In one example implementation, a media gateway keeps track of, or recalculates, various elements within a DSP context that may be constrained. For example, these elements may comprise, amongst other, one or more of a number of terminations and a number of terminations receiving from a particular other termination. On receipt of a call control message, for example from a media gateway controller, the media gateway checks whether a non-cascading implementation of the request would breach any constraint. For example, the number of terminations and/or the number of terminations receiving from a particular other termination may be incremented, without yet fulfilling the request, to model the effect of the request to see if any constraints are breached. If any constraints are breached, a cascade is required. Following this, in certain cases such as FIG. 9, an additional check may be made to determine if cascading is possible. If any constraints are not breached then it is determined that a cascade is not required. However, in certain cases such as FIG. 9, a further check may be made to determine if cascading is desired, e.g. based on "soft" configured criteria as opposed to "hard" DSP limitations.

When considering whether cascading is needed, it should be noted that there may be more than one way for a media gateway to service a call control request. For example, in the case of adding a termination to a call control context, if an existing call control context has more than one DSP context associated with it, then the media gateway may check whether any one of those DSP contexts could handle a new termination. Similarly, one way to service a call control request may comprise the use of DSP context cascades and another way may not require them, each may be legitimate methods to implement the call control context. In this case, the so-called "soft" criteria discussed below may be evaluated to determine a particular method to use for a particular request.

Desirable to Cascade?

In one simple example, it may be desirable to cascade if a cascade is needed, and not desirable to cascade if a cascade is not needed. In other examples though this may not be the case.

In one implementation, it may be desirable to cascade early, i.e. to configure multiple linked DSP contexts even if this configuration is not strictly required to avoid hardware constraints. For example, one or more DSP channels in a DSP context may be reserved to allow future cascading. In this case, if each DSP context is limited to m DSP channels, cascading may be instructed when a number of terminations reaches (m−1). To explain further: in a case where there is a cap of six DSP channels in a DSP context, cascading may be needed if n>m, i.e. n>6. For the first to sixth terminations that are added to the call control context, no cascading is performed as the number of proposed DSP channels is not greater than the DSP context cap (i.e. 6 is not greater than 6). However, if a request is received to add a seventh termination, then the number of proposed DSP channels is greater than the DSP context cap (i.e. 7 is greater than 6) and cascading is needed. However, in this case, one of the existing terminations needs to be moved to the new DSP context as a DSP channel on the existing DSP context is required to link the two DSP contexts, i.e. the second DSP context will need to contain DSP channels for both the sixth and seventh terminations. Movement of this existing termination, i.e. a transfer of the corresponding DSP channel to the new DSP context, may cause undesirable call artefacts, such as glitching, or increase a risk of dropping the call for the user associated with the termination. If, though, it is desirable to cascade when n>(m−1), then a cascade may be triggered by the addition of a sixth termination to the call, where the sixth termination is added to the new DSP context that is linked to the existing DSP context.

Cascading early as described above can potentially avoid disrupting existing DSP channels and thus reduce the risk of media glitches for some or all call parties. However, cascading in this way is inefficient if a seventh termination is never added to a call: if there is no seventh termination only one DSP context is needed for the call. Hence there is a trade-off between the risk of excess resource use and the risk of media glitches. This risk may be measured empirically for implementations and used to encode the criteria for "desirable" cascading.

For example, options for encoding the criteria for "desirable" cascading may comprise one or more of those set out below. In one case a decision of whether to cascade early could be hard-coded, e.g. in a controller program or circuitry. In this case early cascading is either always performed or never performed. In another case early cascading may be based on an existing configuration, e.g. of an existing call control context or of at least a portion of the media gateway. In another case, it may be based on an explicit indication from a media gateway controller, wherein the indication provides a likely number of terminations in the call control context. This number may be provided based on general statistical use patterns for the network and/or a particular call. It may also be provided based on setup information for the call, e.g. an indicated number of likely participants. Similarly, early cascading may be based on an estimate derived from the existing call control topology, or historical call topologies. In another case the criteria for early cascading may be dependent on an amount of available resources within the media gateway. For example, cascading early may be desirable if there are significant spare resources within the media gateway, but undesirable if resources are limited. In another case, early cascading may be instructed based on a permissibility of media glitching for the call in question. For example, if a call is marked as requiring a permanent high-quality connection then early cascading may be applied. Lastly, there may be cases wherein it is not desirable to cascade even though it is possible. This may be applied if resources are constrained within the media gateway. Inhibiting cascading in these cases would avoid 'wasting' scarce resource on cascade links. In any case one or more of these considerations may be encoded into logic applied by a controller of a media gateway, e.g. to be applied at block 930 in FIG. 9. This logic may operate according to one or more thresholds that are applied to accessible measures. These thresholds may be configurable, e.g. by manually or programmatically setting threshold levels.

Possible to Cascade?

In certain examples, before linking DSP contexts a check is made to verify that such linking would result in a correct media topology. A "correct media topology" may be defined in relation to call requirements. For example, FIG. 10 illustrates a configuration 1000 where linear cascading would not be possible without media glitching.

Figure 10:
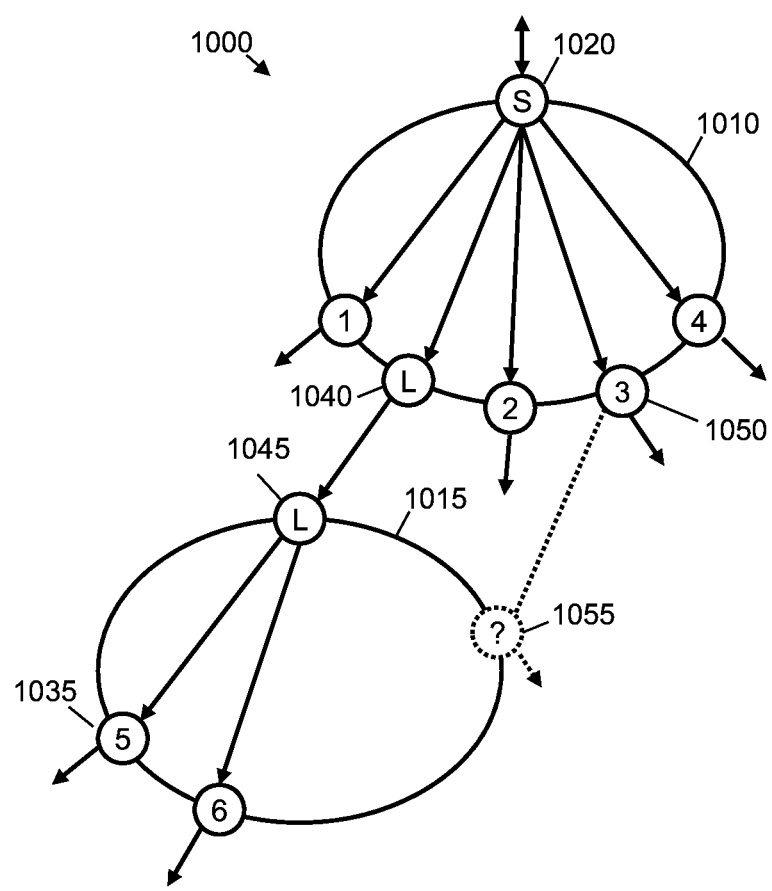
FIG. 10 is a schematic diagram showing a case where it is not possible to associate further digital processor contexts.

FIG. 10 shows a configuration 1000 for a call control context with six listener terminations that are receiving media from a source termination. To implement this configuration in a media gateway with a cap of six DSP channels per DSP context, two DSP contexts are required. A first DSP context 1010 has a first DSP channel 1020 for the source (S) termination and four DSP channels 1, 2, 3, 4 to implement four corresponding listener terminations. A first link (L) DSP channel 1040 is provided in the first DSP content 1010 to communicatively couple said DSP context to a second DSP context 1015, via a second link DSP channel 1045. The second DSP context 1015 then has two DSP channels (5, 6) 1035 to implement the fifth and sixth listener terminations. In this case, a request is received to add a termination to the call control context that should only listen to the third listener. It is also stipulated that the call should be "glitchless". In this case it is not possible to add another DSP channel to the first DSP context 1010 that would be able to receive a media stream from the DSP channel implementing third listener termination, as all available DSP channels in the first DSP context 1010 are being used. Similarly, it is not possible to use the existing link DSP channels as these are in use forwarding media from the DSP channel implementing the source termination. Furthermore, moving a DSP channel for one of the listener terminations (e.g. 1 to 4) would violate the "glitchless" requirement. Hence, there is no DSP context configuration that can exist to service the request and as such the request would need to be declined.

To allow a possible DSP context configuration in the case of FIG. 10 one option would be to drop the requirement for "glitchless" communications. This would allow a DSP channel to be moved from the first DSP context 1010 to accommodate a further link DSP channel. This further link DSP channel could then receive media from the DSP channel 1050 implementing the third listener termination and to forward this to a further link DSP channel within the second DSP context 1015. This further link DSP channel could then forward the media to a new DSP channel in the second DSP context 1015 than could implement the termination listening to the third termination. Another option would be to use a particular "cascading early" strategy, e.g. at the point when n=(m−2), which may avoid the configuration shown in FIG. 10.

Further Example of Implementing a DSP Context Configuration

Figure 11:
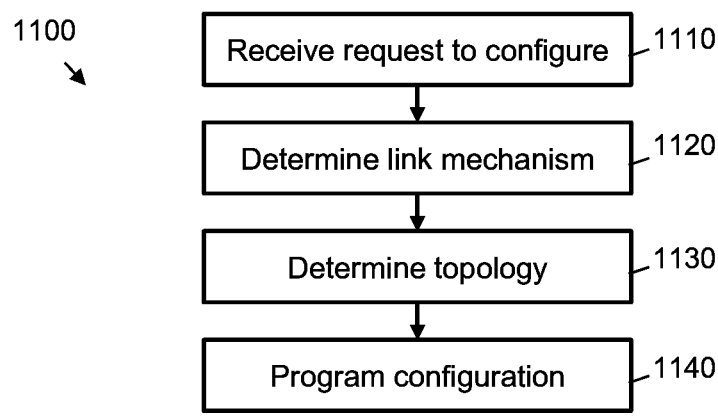
FIG. 11 is a flow chart showing a method of programming a digital signal processor context configuration.

FIG. 11 is a flow diagram showing a method 1100 that may be used to configure multiple DSP contexts. For example, the method 1100 may be used to implement block 960 in FIG. 9. The method 1100 may be performed by a controller of a media gateway.

Turning to FIG. 11, at block 1100 a request is received to configure multiple DSP contexts, i.e. to provide a DSP context cascade, to implement a call control context. This request may arise as a result of block 960 in FIG. 9. At block 1120, a mechanism is selected to link the plurality of DSP contexts. Possible link mechanisms are described in more detail below. At block 1130, a topology is selected to link the plurality of DSP contexts. Possible topologies are described in more detail below. At block 1140, a DSP context configuration is programmed that uses the selected link mechanism and topology. This may comprise programming the use of one or more DSP cores within the media gateway.

To link DSP contexts a number of mechanisms may be used. These may include, amongst others, one or more of an RTP link and a Time-division multiplexing (TDM) timeslot interchanger. The link mechanism to use may be hard-coded, e.g. selected for all cascades, or set based on configuration criteria. In the latter case, a link mechanism may be selected dynamically, e.g. for each cascade based on a current state of the media gateway. For example, in this case, a link mechanism may be selected based on an available quantity of "link" resources. If timeslot interchanger timeslots were constrained and approaching a limit, an implementation may choose to stop selecting a timeslot interchanger mechanism and instead select an RTP link mechanism for new DSP cascades.

As discussed with reference to FIGS. 6 and 7, numerous different topologies may be used to chain DSP contexts together. In certain examples, more complex topologies that those illustrated in the Figures may be used, such as topologies to allow cascading in the case of FIG. 10. There may be a number of ways to select an appropriate topology, and these may vary based on each particular implementation. In one case, one particular topology may be hard-coded, e.g. set as the topology to use for all chained DSP contexts. In this case, all further DSP contexts may be added in one of series or parallel, wherein the latter case may require some series links once all the DSP channels in a particular DSP context are used. This may be set at a hardware or program level. In another case, a media gateway may be able to apply multiple different topologies, but only one topology will be used at any one time. In this case, the topology to use may be set in a configuration file. In another case, a dynamic logic may be applied. This may be based on an indication from a media gateway controller. For example, an indication may provide one or more of: a likely total number of terminations that will end up in the call control context; and any constraints on media latency for terminations in question. This dynamic logic may perform one or more of the following steps: consider the application of any available cascade model; weigh up the comparative merits on each model, based on a combined measure; and choose a particular model based on a value of the combined measure. The combined measure may be based on, amongst others, one or more of: resultant resource usage, such as how many cascaded DSP channels and cascaded DSP contexts are used; and media latency, such as how many cascade links media must cross to get from a "source" DSP channel to a "destination" DSP channel. In the latter case each step or link DSP channel set may add latency due to factors such as jitter buffers. These measures, with possible others, may be suitably weighted in any comparison.

Once a link mechanism and topology have been selected then the link between successive DSP contexts is programmed. The programming of the link may require, in the case of an RTP link, assignment of appropriate User Datagram Protocol (UDP) ports or, in the case of a timeslot interchanger link, assignment of appropriate timeslots. Once these assignments are made then the DSPs of the media gateway can be programmed.

As described above, certain methods may use an indication from a media gateway controller to determine a DSP context cascade. In certain examples, the media gateway controller may provide an indication of an upcoming call topology to perform these determinations. For example, the 3GPP TS 29.232 package 'threegasci' enables a media gateway controller to provide such an indication to the media gateway using a standard call control API. This indication may be used by the media gateway to determine future resource use for a call and hence determine an efficient DSP context topology.

Certain examples as described above increase the flexibility of a media gateway. These examples work with existing media gateway hardware. Certain examples provide a solution to a problem of calls that cannot be naturally programmed on media gateway hardware. Such a problem is typically unaffected by media gateway load but is the result of DSP firmware constraints. Certain implementations avoid modification of DSP firmware to "fix" these hardware constraints; such modifications typically not being effective in most cases (in an analogous way to 'overclocking' a processor). DSP hardware constraints typically apply across DSP cores; as such the described examples may have advantages across a set of media gateway processors.

Although the term "DSP context" has been used herein to refer to a grouping of DSP channels, it should be understood that a "DSP context" may not be an entity separate from said grouping, e.g. "DSP context" is simply a name for the grouping. As such, other implementations may use a similar grouping of DSP channels, e.g. may impose limitations on communication between DSP channels within a DSP, without explicitly implementing an entity called a "DSP context". Similarly, the term "DSP channel" is used herein to refer to a configuration of processing resources to process data. In some implementations, entities functionally similar to "DSP channels" may be referred to as threads, processes, modules, functions etc. without explicitly using the term "channel". It should further be noted that a DSP and/or DSP core may not in practice refer to or otherwise define a "DSP context", i.e. the DSP and/or DSP core may simply operate with groupings of DSP channels that can natively exchange data. This native exchange of data may be by way of an API exposed by DSP firmware.

Figure 1:
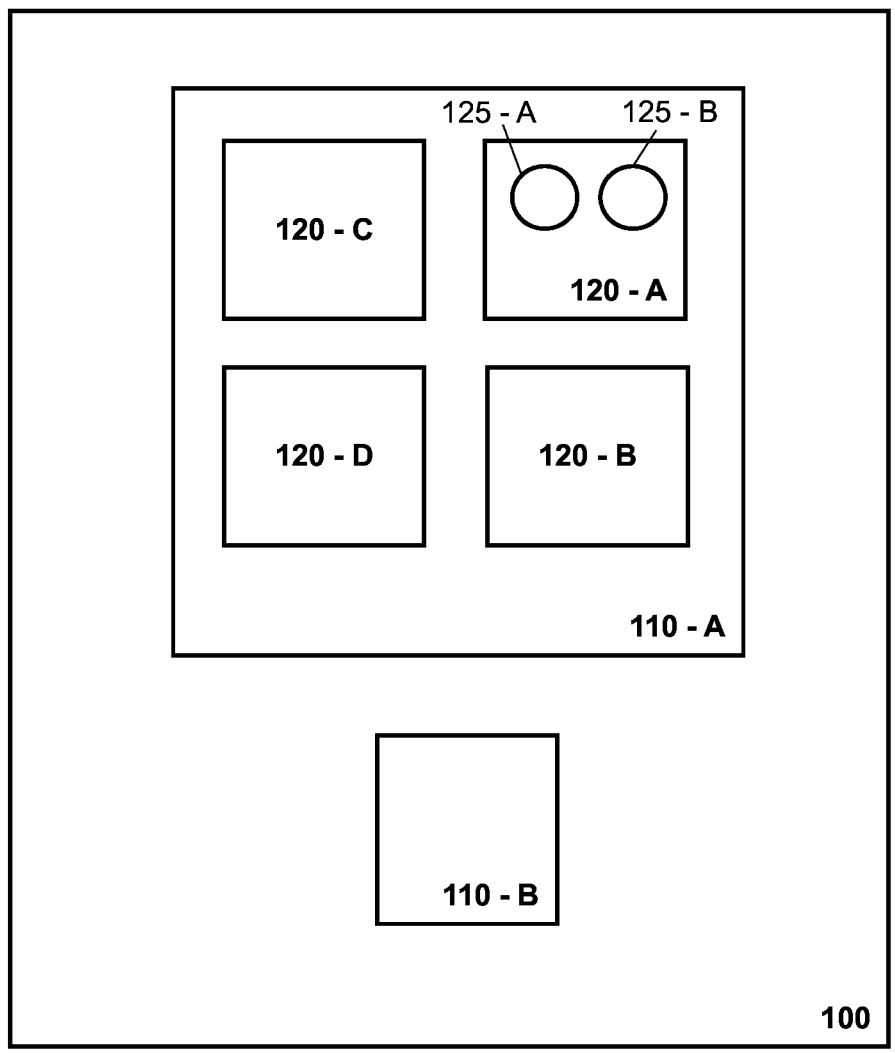
FIG. 1 is a schematic diagram showing a media gateway according to one or more embodiments of the present invention.
Figure 12:
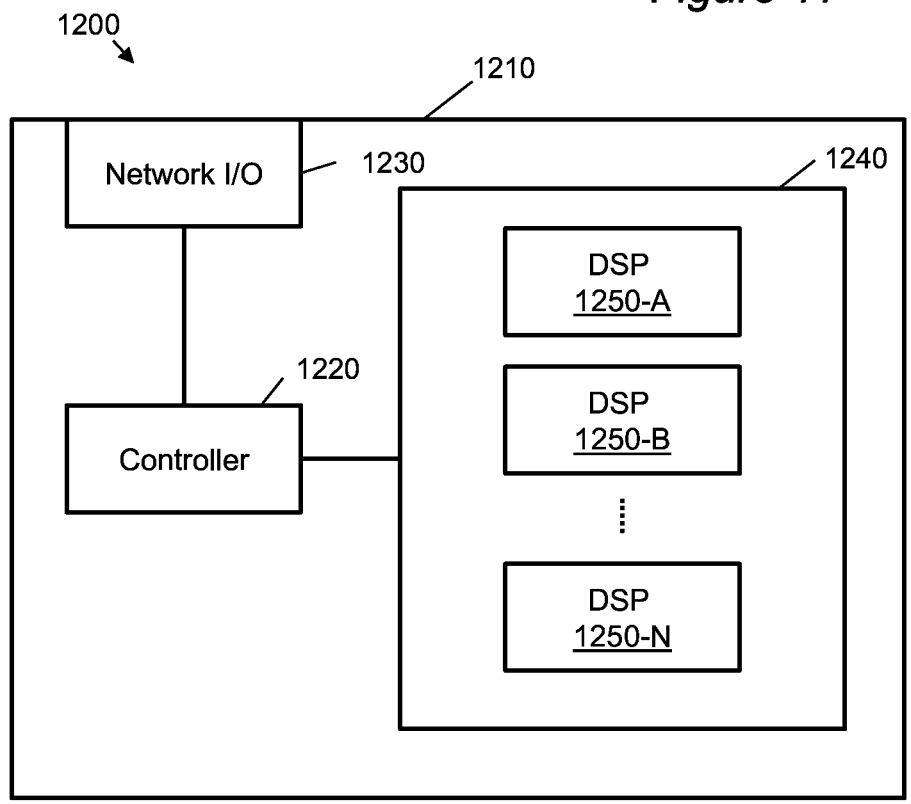
FIG. 12 is a schematic diagram showing control components of a media gateway according to one or more embodiments of the present invention.

Certain methods as described above may be implemented in a hardware controller of the media gateway. One example 1200 is illustrated in FIG. 12. FIG. 12 shows a media gateway 1210 that comprises a controller 1220, a network interface 1230 and a set of processors 1240 comprising a plurality of DSPs 1250, e.g. similar to those shown in FIG. 1. However, in other examples these methods may be implemented in one or more software controllers and/or a combination of hardware and software, such as programmable logic controllers. Examples may also comprise a computer program product comprising a (non-transitory) computer-readable storage medium having computer readable instructions stored thereon, the computer readable instructions being executable by a computerized device to cause the computerized device to perform at least one of the methods described above.

The above description describes a number of illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A media gateway comprising:
one or more digital signal processors,
the one or more digital signal processors comprising one or more digital signal processor cores,
a digital signal processor core in the one or more digital signal processor cores implementing a plurality of digital signal processor channels,
the one or more digital signal processors being configured to implement a plurality of digital signal processor contexts,
each digital signal processor context comprising a plurality of digital signal processor channels implemented on one of the digital signal processor cores,
wherein a digital signal processor channel in a first digital signal processor context of the plurality of digital signal processor contexts is not able to natively exchange data, within the one or more digital signal processors, with a digital signal processor channel in a second digital signal processor context of the plurality of digital signal processor contexts;
an interface to receive a request to configure a call control context for a call,
the call control context comprising a plurality of terminations,
each termination comprising an end point for a data stream associated with the call, such that the call control context is associated with a plurality of data streams; and
a controller to configure the plurality of digital signal processor contexts for the call control context,
wherein the controller configures at least one digital signal processor channels in each of the first and second digital signal processor contexts to process a respective one of the plurality of data streams corresponding to the plurality of terminations, and
wherein the controller programs a first digital signal processor channel in the first digital signal processor context as a first link channel and a second digital signal processor channel in the second digital signal processor context as a second link channel,
wherein, during processing of the call by the media gateway, data is communicated using the first link channel and the second link channel so as to exchange data between the first digital signal processor context and the second digital signal processor context.

2. The media gateway of claim 1, wherein the controller is configured to determine, for a proposed configuration, one or more of:
whether a plurality of digital signal processor contexts are required;
whether a plurality of digital signal processor contexts are desirable;
whether a plurality of digital signal processor contexts are possible; and
a configuration topology for a plurality of digital signal processor contexts.

3. The media gateway of claim 1, wherein a digital signal processor channel that is used to communicatively couple two digital signal processor contexts implements one of:
a real-time transport protocol link; and
a timeslot interchanger.

4. The media gateway of claim 1, wherein the controller is configured to determine if a trigger event has occurred and to configure the plurality of digital signal processor contexts for the call control context in response to the trigger event.

5. The media gateway of claim 1, wherein the call comprises one or more of:
at least one video call;
at least one audio call;
a request for a telecommunications service; and
a teleconference.

6. A method comprising:
receiving, at a media gateway, a request to configure a call control context for a call,
the media gateway comprising one or more digital signal processors,
the one or more digital signal processors comprising one or more digital signal processor cores,
a digital signal processor core in the one or more digital signal processor cores implementing a plurality of digital signal processor channels,
the one or more digital signal processors being configured to implement a plurality of digital signal processor contexts,
each digital signal processor context comprising a plurality of digital signal processor channels implemented on one of the digital signal processor cores,
wherein a digital signal processor channel in a first digital signal processor context of the plurality of digital signal processor contexts is not able to natively exchange data, within the one or more digital signal processors, with a digital signal processor channel in a second digital signal processor context of the plurality of digital signal processor contexts
the call control context comprising a plurality of terminations,
each termination comprising an end point for a data stream associated with the call, such that the call control context is associated with a plurality of data streams; and
configuring, at a media gateway, the plurality of digital signal processor contexts for the call control context,
wherein at least one digital signal processor channel in each of the first and second digital signal processor contexts is configured to process a respective one of the plurality of data streams corresponding to the plurality of terminations,
including programming a first digital signal processor channel in the first digital signal processor context as a first link channel and a second digital signal processor channel in the second digital signal processor context as a second link channel,
wherein, during processing of the call by the media gateway, data is communicated using the first link channel and the second link channel so as to exchange data between the first digital signal processor context and the second digital signal processor context.

7. The method of claim 6, comprising:
responsive to receiving the request, determining one or more of:
whether a plurality of digital signal processor contexts is required, and
whether a plurality of digital signal processor contexts is desired,
wherein configuring the plurality of digital signal processor contexts for the call control context is performed if it is determined that a plurality of digital signal processor contexts is required or desired.

8. The method of claim 6, comprising:
responsive to receiving the request, determining whether a plurality of digital signal processor contexts is possible for an existing call control context,
wherein configuring the plurality of digital signal processor contexts for the call control context is performed if it is determined that a plurality of digital signal processor contexts is possible for an existing call control context.

9. The method of claim 8,
wherein, in the case that the request relates to an existing call control context configured using a plurality of existing digital signal processor contexts, determining whether a plurality of digital signal processor contexts is possible for an existing call control context comprises:
determining whether it is possible to use one or more further digital signal processor contexts to configure the call control context and fulfil the request,
the determining being based on a configuration topology for the existing digital signal processor contexts.

10. The method of claim 6, wherein configuring the plurality of digital signal processor contexts for the call control context occurs in response to a trigger event, the trigger event being associated with a resource limitation of the media gateway.

11. The method of claim 10, wherein the trigger event comprises one or more of:
reaching a predetermined number of digital signal processor channels on a digital signal processor core;
reaching a predetermined number of digital signal processor channels in a digital signal processor context;
reaching a predetermined number of digital signal processor channels that can receive media from a single other digital signal processor channel;
reaching a predetermined number of digital signal processor channels that a single digital signal processor channel can send media to;
reaching a predetermined number of data streams that can be mixed in a single digital signal processor context; and
reaching a predetermined quantity of conferencing resources that are used within a digital signal processor core.

12. The method of claim 6, wherein receiving the request to configure a call control context for the call comprises one or more of:
receiving a request to create a call control context for a new call; and
receiving a request to modify the configuration of a call control context for an existing call.

13. The method of claim 6, wherein the at least one digital signal processor channel that is used to communicatively couple two digital signal processor contexts implements one of:
a real-time transport protocol link; and
a timeslot interchanger.

14. The method of claim 6, wherein configuring the plurality of digital signal processor contexts for the call control context comprises:
determining a configuration topology for the plurality of digital signal processor contexts.

15. The method of claim 6, wherein configuring the plurality of digital signal processor contexts for the call control context comprises:
configuring the plurality of digital signal processor contexts based on one or more media latency constraints for the data streams.

* * * * *